United States Patent [19]
Maehara

[11] Patent Number: 4,556,260
[45] Date of Patent: Dec. 3, 1985

[54] APPARATUS FOR PREVENTING THE LOCKING OF A WHEEL

[75] Inventor: Toshifumi Maehara, Hanazono, Japan

[73] Assignee: Akebono Brake Industry Company Ltd., Tokyo, Japan

[21] Appl. No.: 516,279

[22] Filed: Jul. 22, 1983

[30] Foreign Application Priority Data

Aug. 17, 1982 [JP] Japan .................. 57-142353

[51] Int. Cl.⁴ .............................................. B60T 8/08
[52] U.S. Cl. ................................................. 303/116
[58] Field of Search .............. 188/181 A; 303/10, 61, 303/116–119

[56] References Cited

U.S. PATENT DOCUMENTS

| | | | |
|---|---|---|---|
| 3,532,391 | 10/1970 | Klein | 303/116 X |
| 3,801,161 | 4/1974 | Sharp | 303/116 X |
| 4,099,793 | 7/1978 | Iio | 303/116 |

FOREIGN PATENT DOCUMENTS 2056606 3/1981 United Kingdom .

Primary Examiner—Duane A. Reger
Attorney, Agent, or Firm—Leydig, Voit & Mayer

[57] ABSTRACT

A wheel lock prevention apparatus for use in a motor vehicle includes a main passage connected between a master cylinder and a brake unit for transmitting a brake fluid pressure, a first normally-open solenoid-operated valve disposed in the main passage, a reservoir mechanism for storing a brake fluid, a second normally-closed solenoid-operated valve having one end connected to the main passage between the brake unit and the first normally-open solenoid-operated valve and an opposite end to the reservoir mechanism, and a pump mechanism disposed between the reservoir mechanism and the brake unit for returning the brake fluid from the reservoir mechanism to the brake unit. The pump mechanism is actuated when there is no signal indicating wheel locking and there is a signal representative of a movement of a reservoir piston in the reservoir mechanism.

1 Claim, 6 Drawing Figures

APPARATUS FOR PREVENTING THE LOCKING OF A WHEEL

BACKGROUND OF THE INVENTION

The present invention relates to an apparatus for preventing the locking of a wheel on a vehicle such as a motorcycle, automobile or the like, and more particularly to such a wheel locking prevention apparatus including a brake-fluid pressure transmission system bypassed by a reservoir mechanism for releasing the brake fluid pressure and a pump mechanism for returning the brake fluid from the reservoir mechanism to the brake-fluid pressure transmission system.

There are known antiskid apparatus having a pneumatically operated large-size pressure-reducing device. One type of proposed antiskid apparatus has a directional control valve assembly for releasing the pressurized fluid from a brake-fluid pressure transmission system into a reservoir mechanism when the brake fluid pressure is to be reduced, and for enabling a pump mechanism to pump the fluid from the reservoir mechanism back to the brake-fluid pressure transmission system when the brake fluid pressure is to be increased again. Thus, the antiskid apparatus of this construction serves as a wheel lock prevention apparatus. This type of antiskid apparatus is suitable for use in a design requiring a small-size structure.

The wheel lock prevention apparatus with such a directional control valve assembly has the following construction:

The brake-fluid pressure transmission system (hereinafter referred to as a "main passage") for interconnecting a master cylinder serving as a source for generating a fluid pressure and brake units includes a first normally-open directional control valve (hereinafter referred to as a "first valve") for closing the main passage when the brake fluid pressure is to be reduced. The main passage is bypassed by another passage (hereinafter referred to as a "bypass passage"). The bypass passage and the main passage are interconnected by a second normally-closed directional control valve (hereinafter referred to as a "second valve") which opens when the brake fluid pressure is to be dropped. To the bypass passage, there are connected a reservoir mechanism for reserving the brake fluid at a decreasing pressure while increasing the volume of the reservoir space in response to the pressure of the brake fluid, and a pump mechanism for pumping the brake fluid from the reservoir mechanism into the main passage. The first and second valves are actuated by an electronic control circuit for detecting the locking of a wheel when the automobile is braked.

The pressure of the braking fluid will be controlled by the foregoing wheel lock prevention apparatus as follows: When the wheel braking power exerted at the time the vechile is braked is too large due to a reduced coefficient of friction of the road surface, the speed of rotation of the wheels is abruptly reduced and the wheel is locked, resulting in the danger of losing the steerability of the vehicle. Under such conditions, the wheel lock prevention apparatus controls the pressure of the brake fluid to be lowered to an optimum level. If the brake fluid pressure were reduced excessively, then the wheels would not be locked, but the vehicle would run for an increased distance before it would be stopped completely. Therefore, it is preferable for the wheel lock prevention apparatus to lower the rotational speed of the wheels while maintaining a suitable rate of slippage between the wheels and the road surface. The wheel lock prevention apparatus operates while the vehicle is being braked through depression of the brake pedal by the driver. Since the wheel speed tends to drop in quite a short period of time when the brake pedal is depressed, the wheel lock prevention apparatus is required to be highly responsive.

SUMMARY OF THE INVENTION

It is an object of the present invention to provide a wheel lock prevention apparatus which is relatively simple in construction for preventing a wheel from being locked.

With the present invention, a brake fluid pressure transmission passage is closed, irrespective of whether a brake pedal is depressed or not, at an initial stage of an interval in which a wheel speed is lowered at a rate greater than a desired rate for thereby quickly preventing the brake fluid pressure from building up in a brake unit. If the wheel speed still continues to drop regardless of the prevention of the brake fluid pressure buildup, the fluid pressure in the brake unit is released into a reservoir and thus rapidly reduced. As the wheel speed is recovered, the brake fluid is pumped from the reservoir into the brake unit to allow a progressive increase in the brake fluid pressure.

Since the brake fluid pressure is quickly prevented from building up at the initial period of the interval in which the wheel braking power goes excessive, the danger of any wheel locking is reduced. When the wheel speed is reduced at an abnormal rate, the brake fluid pressure is increased and reduced irrespective of operation of a master cylinder, and there is no change in a reactive force on the brake pedal at the time the latter is depressed.

According to the present invention, a wheel lock prevention apparatus comprising a main passage connected between a master cylinder and a brake unit for transmitting a brake fluid pressure, a first normally-open solenoid-operated valve disposed in the main passage, a reservoir mechanism for storing a brake fluid, a second normally-closed solenoid-operated valve having one end connected to the main passage between the brake unit and the first normally-open solenoid-operated valve and an opposite end to the reservoir mechanism and a pump mechanism disposed between the reservoir mechanism and the brake unit for returning the brake fluid from the reservoir mechanism to the brake unit. The wheel lock prevention apparatus also includes means for opening the second normally-open solenoid-operated valve in response to a first signal indicative of detected wheel locking, the reservoir mechanism including a reservoir piston urged in one direction under a spring force, means for generating a second signal indicative of a movement of the reservoir piston, and an electric circuit for actuating the pump mechanism when the first signal is not produced and the second signal is generated.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
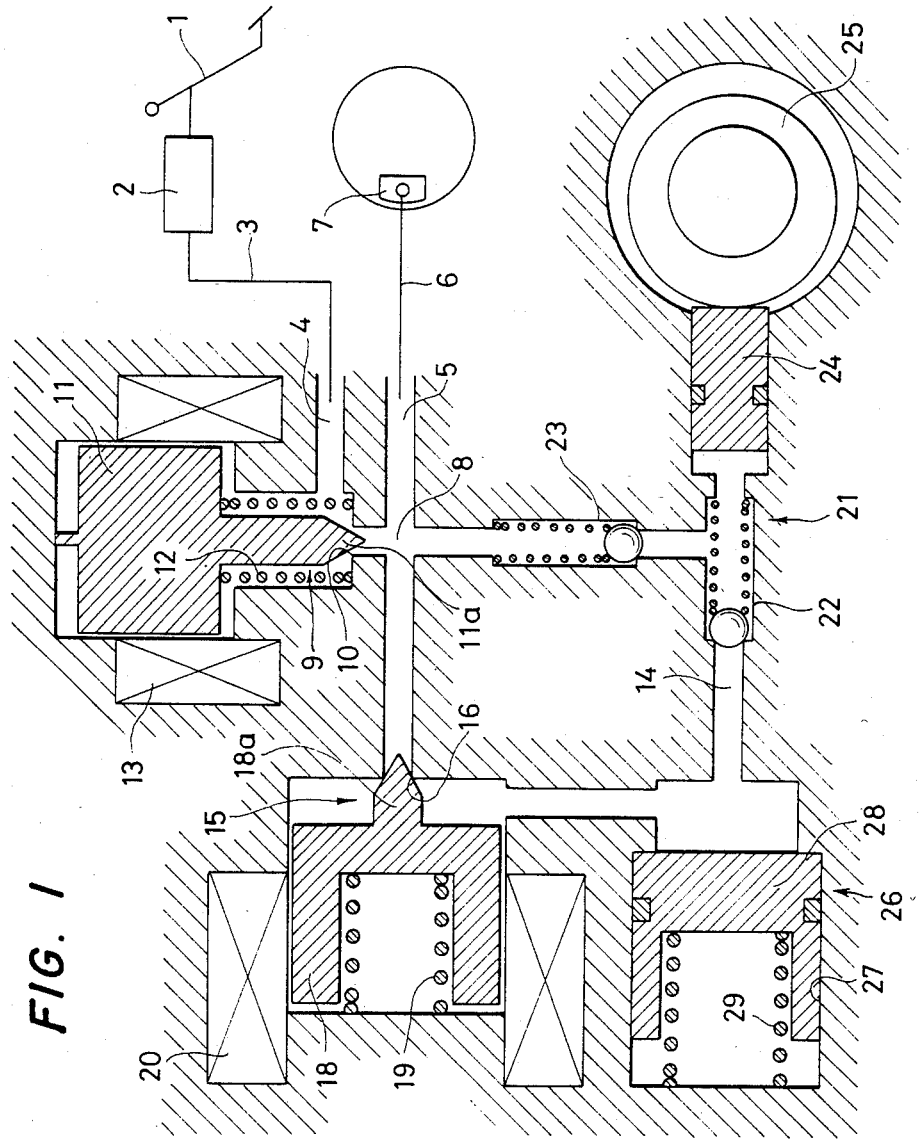
FIG. 1 is a cross-sectional view illustrative of a general construction of a wheel lock prevention apparatus according to the present invention.

As shown in FIG. 1, a brake pedal 1 is operatively connected to a master cylinder 2 which generates a fluid pressure in response to the force with which the brake pedal 1 is depressed. The master cylinder 2 is connected by a fluid pressure transmission pipe 3 to an input port 4 of a valve assembly. The valve assembly has an output port 5 connected by another fluid pressure transmission pipe 6 to a brake unit 7. The fluid pressure transmission pipes 3, 6 and a passage 8 interconnecting the input and output ports 4, 5 serve as and will hereinafter be referred to as main passages.

A first normally-open valve 9 is disposed in the main passage 8 and composed of a valve seat 10, a movable iron core 11 including a valve body 11a, a hold spring 12, and a solenoid 13. The first valve 9 normally keeps the main passage 8 open under the force of the hold spring 12. When the solenoid 13 is energized, the first valve 9 closes the main passage 8. The timing for energizing the solenoid 13 will be described later.

The main passage 8 in the valve assembly is bypassed by a bypass passage 14 to which there are connected a second normally-closed valve 15 and a pump mechanism 21 for pumping a fluid under pressure. The second valve 15 comprises a valve body 18a normally urged under the force of a hold spring 19 to be seated against an open valve seat 16 of the main passage 8. The valve body 18a is unseated from the valve seat 16 when a movable iron core 18 integral with the valve body 18a is electromagnetically attracted by a solenoid 20 in response to energization thereof.

The pump mechanism 21 is composed of a pair of check valves 22, 23, a reciprocably movable plunger 24, and an eccentric cam 25 mounted on a vehicle shaft and rotatable thereby for moving the plunger 24 reciprocably back and forth.

A reservoir mechanism 26 is disposed in the bypass passage 14. The reservoir mechanism 26 has a reservoir piston 28 slidably mounted in a cylinder 27 and normally biased into a stationary position under the force of a reservoir spring 29. When the fluid under pressure is introduced into the bypass passage 14, the reservoir piston 28 is moved against the resiliency of the reservoir spring 29 to thereby reduce the pressure of the fluid introduced.

The wheel lock prevention apparatus of the foregoing construction will operate as follows:

Normal Braking Operation

The pressure of the brake fluid which has been generated in the master cylinder 2 at the time the vehicle is braked is transmitted through the input port 4, the first normally-open valve 9 and the output port 5 to the brake unit 7, which exerts a prescribed braking force. At this time, the second valve 15 is closed.

To assure the above mode of operation, it is necessary to keep the first and second valves 9, 15 open and closed, respectively, reliably at all times. This can be achieved by the arrangement of the invention in the manner described below.

The second valve 15 is normally closed under the force of the hold spring 19. When the brake fluid pressure is to be lowered, the second valve 15 is opened against the force of the hold spring 19 by an electromagnetic force applied by the solenoid 20. The amount of electric power consumed by the solenoid 20 can be smaller if the electromagnetic force produced thereby may be smaller. With the electromagnetic force being of a smaller setting, the force of the hold spring 19 can also be of a smaller setting.

However, the second valve 15 serves to close the communication between the main passage 8 from the bypass passage 14. To keep the second valve 15 closed, the hold spring 19 should be of a setting such that the second valve 15 will not be opened under external forces other than the electromagnetic force imposed by the solenoid 20. Such an external force of primary concern here is a fluid pressure applied from the main passage 8. Accordingly, the spring force of the hold spring 19 must be selected to maintain the valve body 18a seated on the valve seat 16 even under a maximum level of the fluid pressure from the main pasage 8.

The fluid pressure acting on the valve body 18a is dependent on the pressure of the brake fluid, and it is desirable that the area through which the pressure acts on the valve body 18a be as small as possible. To this end, the valve body 18a in the bypass passage 14 is seated on the valve seat 16 having a small-diameter opening communicating with the main passage 8. With this arrangement, the spring force setting for the hold spring 19 can be reduced and the electromagnetic force required can also be reduced.

The fluid pressure acts axially equally on the movable iron core 11 of the first valve 9, so that the electromagnetic force exerted by the solenoid 13 may be of a small setting.

Wheel Lock Prevention Control Mode

This control mode is divided into two steps of operation; one for the closing of the first valve 9 and the other for the opening of the second valve 15. The first valve 9 is closed in response to energization of the solenoid 13, whereupon the fluid communication is cut off between the input and output ports 4, 5. The pressure of the brake fluid in the brake unit 7 will not be raised if the brake pedal 1 is depressed. The valve body 11a can be seated on the valve seat 10 quite rapidly electromagnetically in response to energization of the solenoid 13.

When the solenoid 20 is then energized, the movable iron core 18 is displaced to the left as shown against the force of the hold spring 19, thereby opening the second valve 15. The brake fluid under pressure is now allowed to flow into the reservoir mechanism, in which the reservoir piston 28 starts moving to the left against the resiliency of the spring 29. The pressure of the brake fluid is then rapidly lowered.

Brake Fluid Pressure Buildup in Wheel Lock Prevention Mode

When the wheel is unlocked upon reduction of the brake fluid pressure, the solenoid 20 is de-energized to allow the second valve 15 to return to the normal-closed position. The brake fluid in the reservoir mechanism is now pumped by the pump mechanism 25 continuously into the main passage 8 leading to the brake unit to thereby increase the brake fluid pressure. This is accomplished by rotating the cam 25 to oscillate the piston 24 against the return force exerted by the pressure in the lines. As the piston moves in a forward stroke, increased fluid pressure opens the ball valve 23, allowing fluid into the main passage 8. On the return stroke, ball valve 23 closes and the ball valve 22 opens and draws in fluid from the reservoir ahead of the piston 28 past the ball valve 22 and that fluid is forced past the ball valve 23 to the main line 8 on the subsequent forward stroke of the piston 24. When the brake fluid pressure is built up to a sufficient level, the first valve 9 is opened thereby to provide normal fluid communication in the main passage 8. The wheel lock prevention control is now completed.

When the wheel is locked during the foregoing operation, the wheel lock prevention control mode is initiated again.

Figure 2:
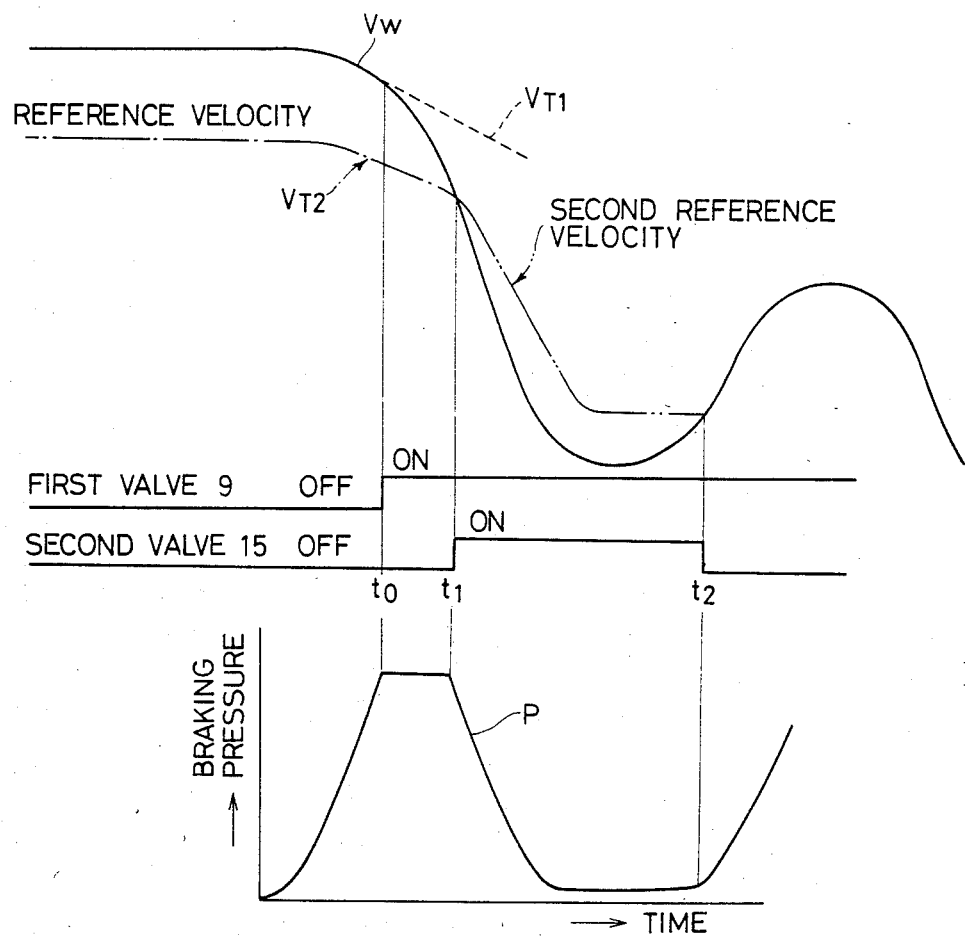
FIG. 2 is a diagram showing the relationship between a wheel speed, operation of valves, and a braking pressure during operation of the wheel lock prevention apparatus of the invention.

Operation control of the first and second valves 9, 15 in the above wheel lock prevention apparatus will be described. The first valve 9 should be actuated at an initial stage of an interval in which the wheel as braked is lowered in rotational speed at a rate greater than an optimum rate, thus preventing the fluid pressure from building up in the brake unit. For this purpose, as shown in FIG. 2, the first valve 9 is electromagnetically operated at a time $t_0$ when a detected wheel speed signal Vw indicates a deceleration rate greater than a constant preset deceleration gradient $V_{T1}$.

The second valve 15 should be actuated when operation of only the first valve 9 is not enough to stop the buildup of the pressure of the brake fluid. For example, a reference velocity $V_{T2}$ is preset which has the relationship $Vw - \Delta V = V_{T2}$ with respect to the wheel speed Vw and which has a reduction rate below a constant value. The wheel speed Vw and the reference signal $V_{T2}$ are compared, and when $V_{T2} > Vw$, the second valve 15 is electromagnetically operated.

With such an arrangement, the brake fluid pressure is selectively maintained or reduced dependent on the rate of reduction of the wheel speed Vw for accomplishing desired wheel braking force control. The first valve 9 may be inactivated when $V_{T1} > Vw$ and the second valve 15 may be rendered inoperative when the wheel speed Vw is recovered from a low peak up to a certain level.

The foregoing operation control of the first and second valves can be achieved by a known electric circuit arrangement. The operation control according to the apparatus of the invention is not limited to that shown in FIG. 2, but may be effected in various other modes.

Figure 3:
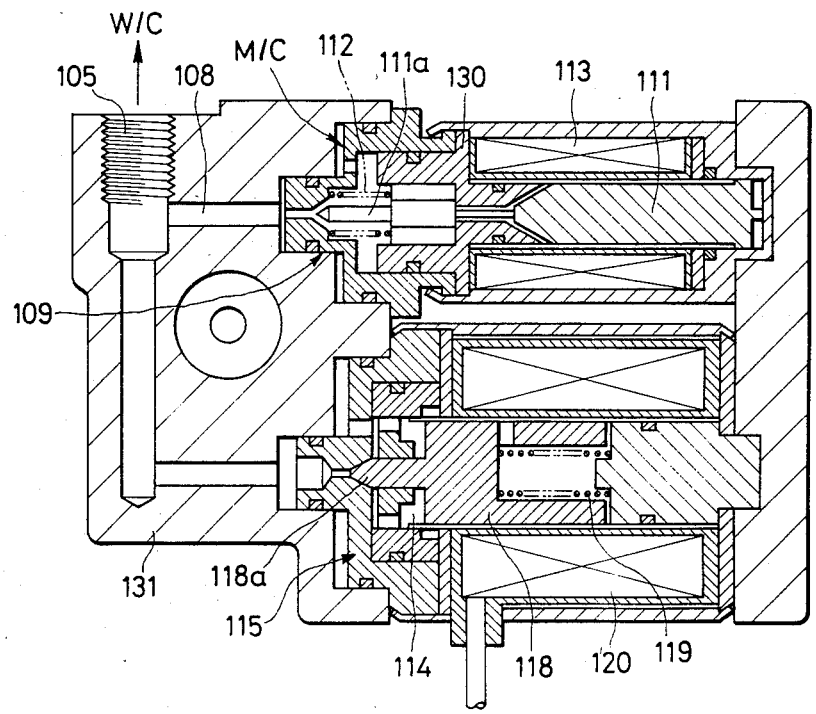
FIGS. 3 and 4 are cross-sectional views showing specific structural arrangements of the wheel lock prevention apparatus of FIG. 1.
Figure 4:
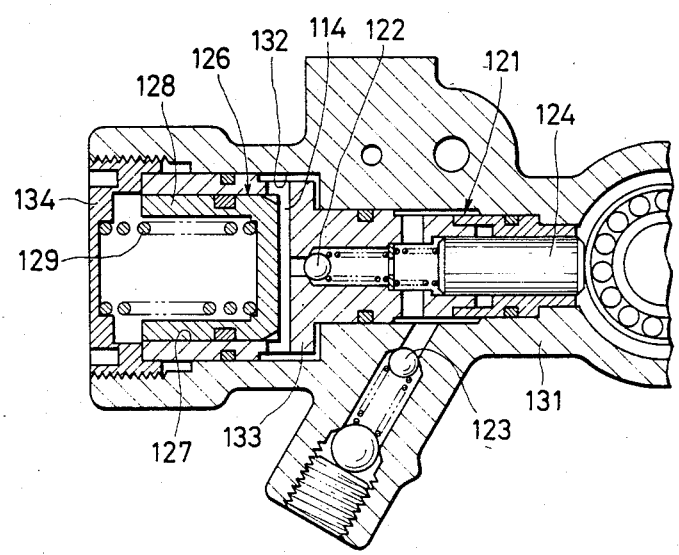

FIG. 3 illustrates in a specific construction the first and second valves 9, 15 shown in FIG. 1, and FIG. 4 illustrates a specific construction of the reservoir mechanism 26 and the pump mechanism 21 shown in FIG. 1. Corresponding parts shown in FIGS. 3 and 4 are denoted by corresponding reference characters shown in FIG. 1, with the addition of 100. In the embodiment of FIGS. 3 and 4, a first valve 109 have a movable iron core 111 and a valve body 111a which are separate from each other, and the movable iron core 111 is disposed in confronting relation to a fixed iron core 130 through conical surfaces for efficiently utilizing an electromagnetic force generated. Furthermore, the first valve 109 and a second valve 115 are constructed as unit assemblies separate from a valve body 131, and can be fastened thereto. Thus, the valves and the valve body can be assembled together through an improved assembling procedure. The valve body 131 has a stepped cylinder 132 housing therein a plug 133 with a reservoir mechanism 126 and a pump mechanism 121 contained therein, the plug 133 being retained in place by a plug stop 134. The reservoir mechanism 126 and the pump mechanism 121 can also be assembled into the valve body 131 through an improved assembling process.

Figure 5:
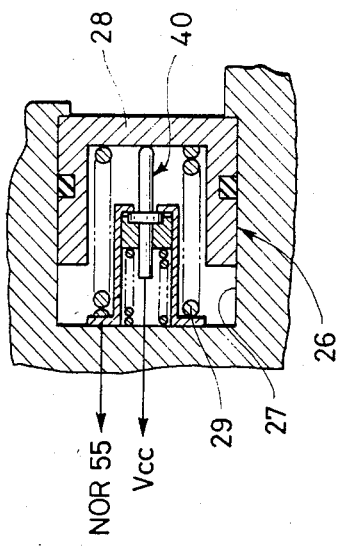
FIG. 5 is fragmentary cross-sectional view of a modified wheel lock prevention apparatus according to the present invention.

According to another embodiment shown in FIG. 5, a normally-closed limit switch 40 is mounted in a reservoir piston 28 for detecting a leftward movement of the reservoir piston 28.

If the second valve 15 were poorly sealed under normal braking conditions in which the wheels are not locked, the brake fluid would leak from the master cylinder 2 (FIG. 1) into the reservoir mechanism 26, reducing the force with which the wheels are braked.

Figure 6:
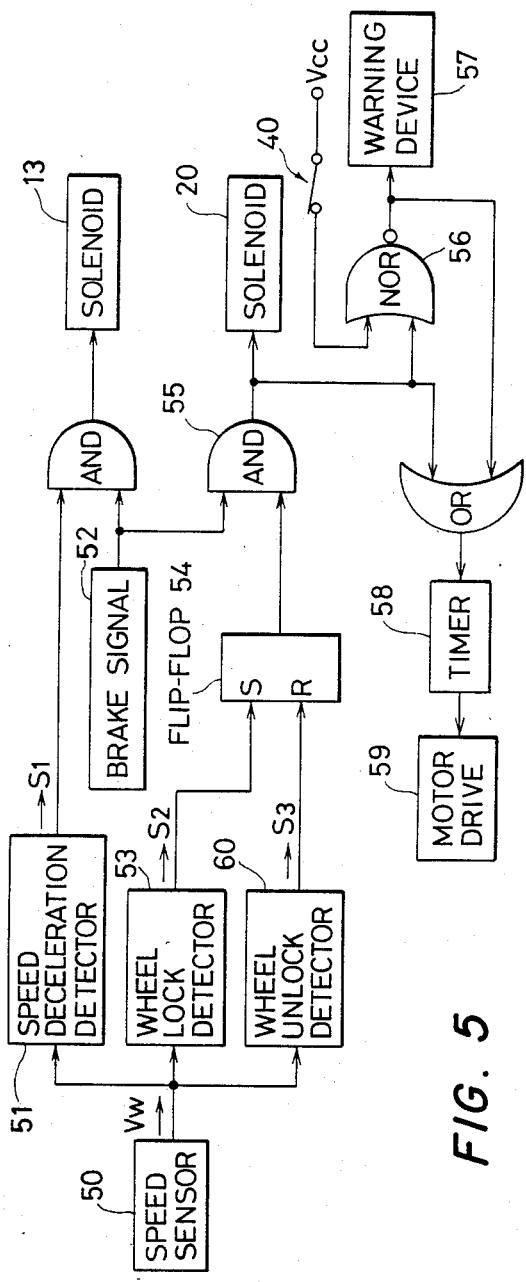
FIG. 6 is a block diagram of the wheel lock prevention apparatus illustrated in FIG. 5.

Operation of such a modified arrangement will be described with reference to FIG. 6.

The solenoid 13 is energized to close the first valve 9 in response to a signal $S_1$ from speed deceleration detector 51, the signal $S_1$ being indicative of a wheel speed Vw as detected by a speed sensor 50 which exceeds a certain speed value $V_{T1}$. A brake signal generator 52 comprises a switch associated with the brake pedal for generating a signal when the brake pedal is depressed. A flip-flop 54 is set by a signal $S_2$ from a wheel lock detector 53, which indicates that a wheel is locked, thus energizing the solenoid 20 to open the second valve 15. The brake fluid in the brake unit 7 is delivered into the reservoir mechanism 26 and moves the reservoir piston 28 to the left until the limit switch 40 is opened. At this time, a NOR gate 56 does not issue an output signal as there is an input signal from an AND gate 55, and a warning device 57 remains de-energized. The signal from the AND gate 55 actuates a timer 58 for enabling a motor drive 59 to rotate the motor for the pump 21. The timer 58 has been set for a time interval equal to or greater than at least one control cycle, and is reset each time an input signal is applied thereto. When the wheel is unlocked, the flip-flop 54 is reset by a signal $S_3$ from a wheel unlock detector 60, and the solenoid 20 is de-energized to close the second valve 15.

When the reservoir piston 28 is moved leftward by the brake fluid leaking from the second valve 15 during normal braking operation with no wheel locking, the limit switch 40 is opened. At this time, there is no output signal from the AND gate 55, and the NOR gate 56 is enabled to produce an output signal which energizes the warning device 57 to warn the driver of the malfunctioning. The output signal from the NOR gate 56 also energizes the timer 58 to actuate the pump 21 for pumping any brake fluid leakage from the reservoir mechanism into the brake unit. Accordingly, the braking power can be prevented from being reduced due to any leaking brake fluid.

Although certain preferred embodiments have been shown and described, it should be understood that many changes and modifications may be made therein without departing from the scope of the appended claims.

What is claimed is:

1. A wheel lock prevention apparatus comprising:
   (a) a master cylinder;
   (b) a brake unit for braking a wheel in response to actuation of said master cylinder;
   (c) a main passage connected between said master cylinder and said brake unit for transmitting a brake fluid pressure;
   (d) a first normally-open solenoid-operated valve disposed in said main passage which is independent of brake fluid pressure for operation;
   (e) a reservoir mechanism including a movable reservoir piston for storing a brake fluid and urged in one direction by a spring force;
   (f) a second normally-closed solenoid-operated valve having one end connected to said main passage between said brake unit and said first normally-open solenoid-operated valve and an opposite end connected to said reservoir mechanism;
   (g) a pump mechanism disposed between said reservoir mechanism and said brake unit for returning the brake fluid from said reservoir mechanism to said brake unit;
   (h) means for opening said second normally-closed solenoid-operated valve in response to a first signal indicative of detected wheel locking;
   (i) means for generating a second signal indicative of movement of said reservoir piston for storing brake fluid; and
   (j) an electric circuit for actuating said pump mechanism when said first signal is not produced and said second signal is generated.

* * * * *